Patented June 10, 1924.

1,497,371

UNITED STATES PATENT OFFICE.

DAVID GIBBON, OF PITTSBURGH, PENNSYLVANIA.

CREMATORY FURNACE.

Application filed January 30, 1923. Serial No. 615,861.

*To all whom it may concern:*

Be it known that I, DAVID GIBBON, a citizen of the United States, residing at Pittsburgh, in the county of Allegheny and State of Pennsylvania, have invented certain new and useful Improvements in Crematory Furnaces, of which the following is a specification.

This invention is for a crematory furnace of the type in which the reduction of a body is effected by the direct application of the fire thereto, as distinguished from the oven or retort type.

The invention has for its object to provide a furnace of this type for speedily effecting the complete reduction of all parts of the body, the more resistant parts being as completely reduced as the other parts, the furnace being further designed that no obnoxious flue gases are noticeable during the operation of the furnace.

The invention may be readily understood by reference to the accompanying drawings, in which.

Figure 1:
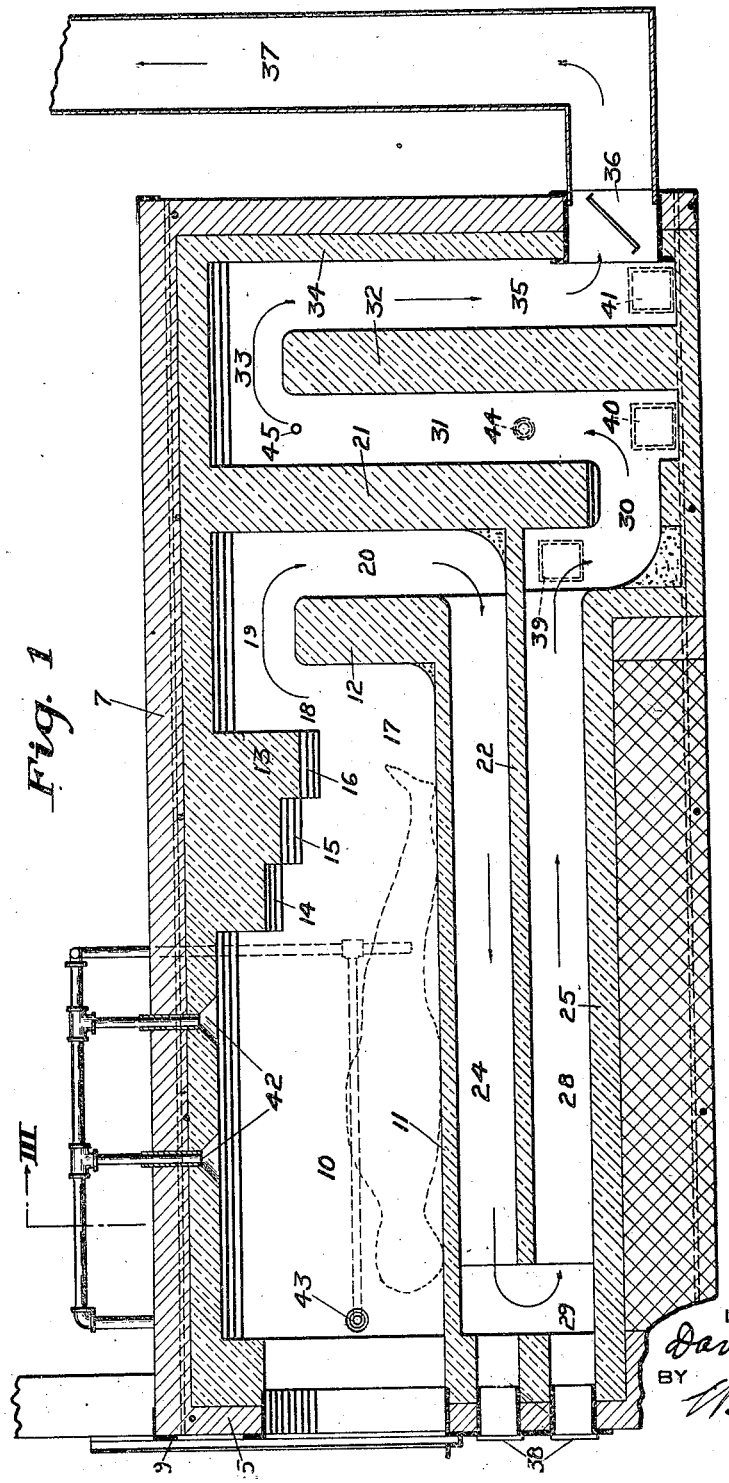
Fig. 1 is a longitudinal section through a furnace constructed in accordance with my invention.
Figure 2:
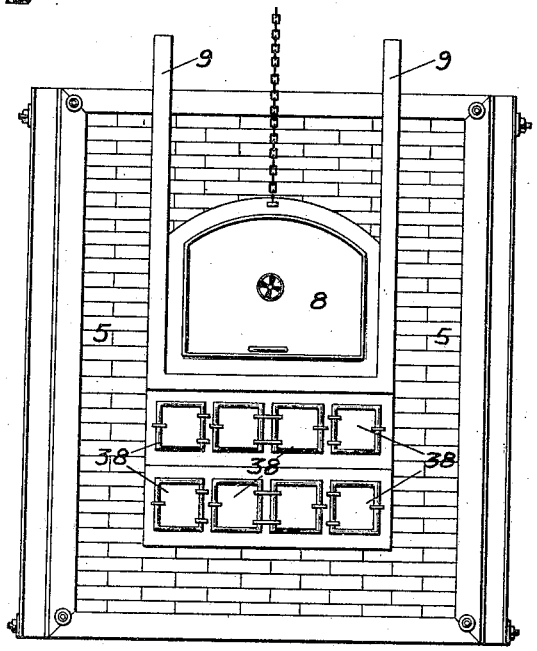
Fig. 2 is a front end view thereof.
Figure 3:
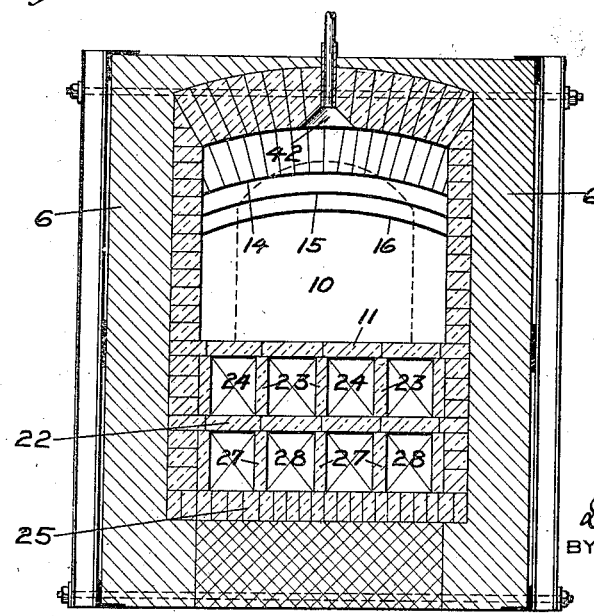
Fig. 3 represents a transverse section in the plane of line III—III of Fig. 1.

Referring to the drawings, the furnace has a front wall 5, side walls 6, and a top 7. At 8 is a door slidable vertically in guides 9. This door opens into a combustion chamber 10 whose bottom is in the form of a refractory hearth 11, at the inner end of which is a vertical wall 12. The top of the combustion chamber is arched, and at a point in advance of the wall 12 is a projecting baffle 13 in which are formed three successively smaller arches 14, 15 and 16, respectively, a horizontal outlet passage being provided at 17 between the smallest arch and the hearth, through which gases may pass from the combustion chamber into an upwardly extending vertical passage 18 between the rear of part 13 and baffle 12. This passage in turn leads to a short rearwardly extending horizontal passage 19 between the top of wall 12 and the top wall of the furnace. Back of the wall 12 is a vertical passage 20 communicating with the passage 19, so that gases from passage 19 pass down flue 20. The flue 20 is formed between back wall 12 and a vertical wall 21.

The space under the hearth is divided into a plurality of passages, so designed as to give proper support to the hearth and at the same time provide several longitudinal flues to increase the total length of flues through which the gases must pass, a feature which is desirous in furnaces of this nature.

Under the hearth and spaced downwardly therefrom, is a horizontal wall 22 extending from the vertical wall 21 forwardly almost to the front wall of the furnace. The space between this partition 22 and the under face of the hearth is divided by a series of vertical walls 23 into a plurality of flues 24 which communicate at their rear end with passage 20. These partitions provide a necessary support for the hearth.

Spaced down from the partition 22 is a bottom floor 25 and below it is a suitable filling which may be composed of hollow tile. The space between partition 22 and floor 25 is divided the same way as the passage above it, by longitudinal vertical walls 27, into a plurality of longitudinally extending flues 28. At 29 is an open passage from which gases may pass from flues 24 into flues 28. The flues 28 communicate with a passage 30 that leads under the lower end of wall 21 to a vertical passage 31 between wall 21 and a partition wall 32. The vertical passage 31 joins into a short rearwardly extending passage 33 disposed between the top of wall 32 and the top of the furnace.

The rear wall of the furnace is designated 34, and is spaced back from the vertical wall 32 so as to provide a descending gas passage 35 from passage 33 to flue opening 36, into chimney 37.

In the front of the furnace are a plurality of doors 38 through which access may be had to the flues 24 and 28, one door preferably being provided for each flue. At 39, 40 and 41 are other doors of a similar nature.

Located in the top wall of the furnace, centrally of the main chamber, are two gas or oil burners 42 of a type extensively used in furnaces of this nature. The combustion chamber is so designed that when a body to be cremated is laid on the hearth, these two burners will be substantially over the trunk of the body, while the feet will be disposed under the small arches 14, 15 and 16.

At 43 are other burners similar to burners 42, arranged to project a flame toward the head of a body when the body is inserted as described. These two burners project through the side walls of the furnace from opposite sides.

In the passageway 31 is a small burner 44 and at 45 is a pipe designed to introduce a small stream or quantity of water into the upper part of passage 31.

In operation, burner 44 is first lighted to create a draft through the furnace and thus draw out any dampness or stale air which may be in it, as well as to heat the passage 31, so that as water is introduced at 45, it will be converted into steam. After the body has been placed on the hearth, all the burners in the combustion chambers are lighted, and burner 44 may, if desired, be turned out.

The burners 42 and 43 are of the type commonly used in this art, wherein the combustible mixture of air and gas is introduced at a remote point from the burner, and the flame has considerable force and blast. In moving toward the outlet end of the chamber, the gases strike the smaller arches 14, 15 and 16, and are caused to swirl or eddy back through the combustion chamber, thereby creating an intense heat in said chamber and causing a thorough mixing of all gases and air in the combustion chamber. As the intensely hot gases flow out of the chamber into the flues, combustion continues so that any smoke or unburned combustible gases may burn in the flues. The flues under the hearth quickly become highly heated, heating the hearth from the bottom, and thereby heat the under side of the body. As the flues become more highly heated, combustion of smoke or combustible gases is more complete, with the result that no obnoxious fumes or gases pass out the flue.

The small amount of water introduced into the flue 31 and converted into steam is sufficient to effect a precipitation of all carbon that is carried by the flue gases.

The location of the burners 42 directly over the trunk of the body, together with the arrangement of arches as specified, enables the trunk of the body to be entirely reduced, thereby correcting the obstacle that presents the most difficulty to the satisfactory operation of other furnaces now provided for this purpose.

The cross lining of the sections show how the furnace may be designed, and those parts which are subject to heat formed of refractory brick or clay, while the outer casing of the furnace may be of any suitable design.

I claim as my invention:

1. A crematory having a combustion chamber for the reception of bodies, a hearth forming the bottom of the chamber, a vertical imperforate baffle wall at the rear end of the hearth extending upwardly from the hearth, a series of successively smaller arches formed in the top wall of said chamber in advance of said vertical wall so arranged as to form a continuous passage of decreasing area toward the said vertical wall and to provide a vertical passage open at its upper end at the rear end of the hearth in front of said vertical wall, and a burner in the top wall of the combustion chamber arranged to direct a flame downwardly toward the hearth.

2. A crematory furnace having a combustion chamber therein, a hearth forming the bottom of the combustion chamber, a vertical flue open at its upper end at one end of the combustion chamber through which gases may be withdrawn from said chamber, means in the combustion chamber so arranged to form a passage of decreasing area toward the said flue, a horizontal flue extending under the hearth for substantially its entire length, a second vertical flue connecting the first vertical flue with the horizontal flue through which the gases from the combustion chamber pass, and another horizontal flue leading in the opposite direction from said first horizontal flue and communicating with said first horizontal flue.

3. A crematory furnace having a combustion chamber therein, a hearth forming the bottom of the combustion chamber, a vertical wall at the rear of the hearth, a series of successively smaller arches in the combustion chamber arranged to form a continuous passage of decreasing area toward the vertical wall and a vertical passage in front of said wall, a horizontal flue extending under the hearth for substantially its entire length, through which the gases from the combustion chamber pass, a flue connecting the horizontal passage and the said vertical passage, and another horizontal flue leading in the opposite direction from said first horizontal flue and communicating with the said first horizontal flue, said second horizontal flue being disposed in a plane below the first.

4. A crematory furnace having a combustion chamber therein, a hearth forming the bottom of the combustion chamber, a wall at one end of the hearth extending upwardly from the hearth, a vertical flue open at its upper end being formed in front of said wall and through which gases may be withdrawn from said chamber, means in the combustion chamber so arranged to form a passage of decreasing area toward the said flue, a horizontal flue extending under the hearth for substantially its entire length through which the gases from the combustion chamber pass, a second vertical flue connecting the first one with the horizontal flue, another horizontal flue leading in the opposite direction from said first horizontal flue and communicating with said first horizontal flue, a vertical flue into which said second horizontal flue leads, and means in said vertical flue for providing steam therein.

5. A crematory furnace having a combustion chamber therein, a hearth forming the bottom of the combustion chamber, a baffle wall at one end of the hearth extending upwardly therefrom, a vertical flue open at its top being formed at the front of the baffle wall and through which gases may be withdrawn from said chamber, means in the combustion chamber so arranged to form a passage of decreasing area toward the said flue, a horizontal flue extending under the hearth for substantially its entire length, through which the gases from the combustion chamber pass, a second vertical flue behind the baffle wall connecting the first vertical flue with said horizontal flue, another horizontal flue leading in the opposite direction from said first horizontal flue and communicating with said first horizontal flue, a vertical flue into which said second horizontal flue leads, which vertical flue is disposed rearwardly of the combustion chamber, a second vertical flue for receiving gases from the first vertical flue, and a chimney outlet in said second vertical flue.

6. A crematory furnace having a combustion chamber therein, a hearth forming the bottom of the combustion chamber, a flue at one end of the combustion chamber through which gases may be withdrawn from said chamber, a horizontal flue extending under the hearth for substantially its entire length, through which the gases from the combustion chamber pass, another horizontal flue leading in the opposite direction from said first horizontal flue and communicating with said first horizontal flue, a vertical flue into which said second horizontal flue leads, a burner in said vertical flue, and means for introducing water into said vertical flue above the burner.

7. A crematory furnace having a combustion chamber therein, a burner in the top of the combustion chamber, a refractory floor for the combustion chamber, a door at the front end of the chamber, a vertical wall at the back thereof, a flue passage in front of said vertical wall, means in the combustion chamber forming a passage of decreasing area toward said flue, a down passage back of said wall, a horizontal passage under said floor through which the gases pass from said down passage to heat the floor, said horizontal passage leading to the front end of the furnace, a second horizontal passage under the first horizontal passage for receiving gases therefrom and returning them to the rear part of the furnace, a vertical flue into the lower end of which said second horizontal passage leads, a second vertical flue back of the first and designed to receive gases at its upper end from the upper end of said first vertical flue, and a chimney outlet near the bottom of said second vertical passage, said passages giving the gases a great length of travel through the furnace after leaving the combustion chamber and before going to the chimney, whereby thorough combustion of gases is insured.

In testimony whereof I affix my signature.

DAVID GIBBON.